United States Patent
Sturms et al.

(10) Patent No.: US 11,308,272 B1
(45) Date of Patent: Apr. 19, 2022

(54) CONTROLLING A PRODUCTIVITY APPLICATION TO INTEGRATE A REVISION STREAM AND AN UNDO STACK TO PERFORM OUT OF ORDER UNDO OPERATIONS

(71) Applicant: Microsoft Technology Licensing, LLC, Redmond, WA (US)

(72) Inventors: James Richard Sturms, Seattle, WA (US); Ying Zhang, Redmond, WA (US); Sherman Chee Ming Der, Issaquah, WA (US); Nicholas Kyle Ryan, Redmond, WA (US); Dmitri Viktorovich Kotchetov, Redmond, WA (US); Sanjay Krupakar Bhat, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/095,919

(22) Filed: Nov. 12, 2020

(51) Int. Cl.
 *G06F 40/00* (2020.01)
 *G06F 40/197* (2020.01)
 (Continued)

(52) U.S. Cl.
 CPC ........ *G06F 40/197* (2020.01); *G06F 16/1774* (2019.01); *G06F 40/151* (2020.01); *G06F 40/166* (2020.01); *G06F 40/18* (2020.01)

(58) Field of Classification Search
 CPC ....... G06F 40/197; G06F 40/166; G06F 40/18
 See application file for complete search history.

(56) References Cited

U.S. PATENT DOCUMENTS

| | | | |
|---|---|---|---|
| 6,523,134 B2 * | 2/2003 | Korenshtein | G06F 9/451 714/16 |
| 7,207,034 B2 | 4/2007 | Burke et al. | |
| (Continued) | | | |

FOREIGN PATENT DOCUMENTS

EP    3008638    4/2016

OTHER PUBLICATIONS

"International Search Report and Written Opinion Issued in PCT/US21/052746", dated Jan. 19, 2022, 9 Pages.

*Primary Examiner* — Scott T Baderman
*Assistant Examiner* — Barbara M Level
(74) *Attorney, Agent, or Firm* — Christopher J. Volkmann; Kelly, Holt & Christenson, PLLC

(57) ABSTRACT

A computing system runs a productivity application that maintains an integrated, time ordered revision/undo stack. Entries in the revision/undo stack identify revision operations that a user has made to a document and corresponding undo operations that can be executed to undo the revision operation. The computing system detects an undo input indicative of a user actuating un undo actuator to undo a previous operation, that is prior to a most current operation that the user has performed. An operational transform system identifies an undo operation in the undo stack, corresponding to the revision that the user selected in the revision/undo stack. The operational transform system traverses the revision/undo stack to identify subsequent operations that were performed subsequent to the previous operation, and identifies one or more transforms to be applied to the undo operation based upon the identified subsequent operations. The operational transform system then transforms the undo operation, using the transformation function, and applies the transformed undo operation to the document.

18 Claims, 12 Drawing Sheets

(51) Int. Cl.
*G06F 40/18* (2020.01)
*G06F 16/176* (2019.01)
*G06F 40/151* (2020.01)
*G06F 40/166* (2020.01)

(56) References Cited

U.S. PATENT DOCUMENTS

| | | |
|---|---|---|
| 2008/0172607 A1* | 7/2008 | Baer ................... G06F 40/166 715/255 |
| 2009/0177703 A1* | 7/2009 | Cuneo ................ G06F 11/1446 |
| 2011/0113326 A1 | 5/2011 | Baer |
| 2014/0250411 A1 | 9/2014 | Gilra et al. |
| 2015/0199270 A1 | 7/2015 | Day-Richter et al. |
| 2016/0041963 A1* | 2/2016 | Coblenz ................ G06F 40/177 715/227 |
| 2017/0031770 A1* | 2/2017 | Breedvelt-Schouten .................... G06F 3/0482 |
| 2017/0116179 A1* | 4/2017 | Gagne-Langevin ........................ G06F 40/226 |
| 2017/0330149 A1 | 11/2017 | Hunter et al. |
| 2017/0357675 A1 | 12/2017 | Underwood et al. |
| 2019/0370321 A1* | 12/2019 | Bisceglie ................ G06F 16/93 |

* cited by examiner

FIG. 5A

| STACK ENTRY | | |
|---|---|---|
| ENTRY NUMBER (TIME STAMP, SEQUENTIAL IDENTIFIER) 210 | FORWARD REVISION INDICATOR 212 | BACKWARD UNDO INDICATOR 214 |
| | | OTHER 216 |

| INTEGRATED, TIME ORDERED REVISION / UNDO STACK | | |
|---|---|---|
| ENTRY NUMBER | FORWARD REVISION INDICATOR | BACKWARD UNDO INDICATOR |
| 1 | B4, 3 TO 33 | B4, 33 TO 3 |
| | | OTHER |
| | | SANJAY |

FIG. 5C

| INTEGRATED, TIME ORDERED REVISION / UNDO STACK | | |
|---|---|---|
| ENTRY NUMBER | FORWARD REVISION INDICATOR | BACKWARD UNDO INDICATOR |
| 1 | B4, 3 TO 33 | B4, 33 TO 3 |
| 2 | B8, 7 TO 9 | B8, 9 TO 7 |
| | | OTHER |
| | | SANJAY |
| | | YING |

FIG. 5D

| INTEGRATED, TIME ORDERED REVISION / UNDO STACK | | |
|---|---|---|
| ENTRY NUMBER | FORWARD REVISION INDICATOR | BACKWARD UNDO INDICATOR |
| 1 | B4, 3 TO 33 | B4, 33 TO 3 |
| 2 | B8, 7 TO 9 | B8, 9 TO 7 |
| 3 | SORT A1:C8 BY B ASCENDING | <SORT UNDO RECORD> |
| | | OTHER |
| | | SANJAY |
| | | YING |

FIG. 5E

| INTEGRATED, TIME ORDERED REVISION / UNDO STACK | | | |
|---|---|---|---|
| ENTRY NUMBER | FORWARD REVISION INDICATOR | BACKWARD UNDO INDICATOR | OTHER |
| 1 | B4, 3 TO 33 | B4, 33 TO 3 | SANJAY |
| 2 | B8, 7 TO 9 | B8, 9 TO 7 | YING |
| 3 | SORT A1:C8 BY B ASCENDING | <SORT UNDO RECORD> | |
| 4 | B6, 10 TO 20 | B6, 20 TO 10 | DMITRI |

FIG. 5F

| INTEGRATED, TIME ORDERED REVISION / UNDO STACK | | | |
|---|---|---|---|
| ENTRY NUMBER | FORWARD REVISION INDICATOR | BACKWARD UNDO INDICATOR | OTHER |
| 1 | B4, 3 TO 33 | B4, 33 TO 3 | SANJAY |
| 2 | B8, 7 TO 9 | B8, 9 TO 7 | YING |
| 3 | SORT A1:C8 BY B ASCENDING | <SORT UNDO RECORD> | |
| 4 | B6, 10 TO 20 | B6, 20 TO 10 | DMITRI |
| 5 | B7, 30 TO 5 | B7, 5 TO 30 | NICK |

CONTROLLING A PRODUCTIVITY APPLICATION TO INTEGRATE A REVISION STREAM AND AN UNDO STACK TO PERFORM OUT OF ORDER UNDO OPERATIONS

BACKGROUND

Computing systems are currently in wide use. Some computing systems are configured to run productivity applications, such as spreadsheet applications, word processing applications, slide presentation applications, among others.

In some examples, a productivity application resides and runs on a user's computer, such as when the productivity application is a desktop version of the productivity application. In other examples, a computing system hosts the productivity application so that it can be accessed by multiple different client applications. In a computing system that hosts a productivity application, collaborative functionality is often used in generating a document. Therefore, users use client systems to access the document over a network, in a collaborative fashion, so that multiple users can collaborate on a document, simultaneously.

In some productivity applications, a user can manipulate table-like structures, and sometimes equations as well. For instance, spreadsheet applications can be controlled to allow a user to manipulate values in cells in a spreadsheet, and to perform operations on those values, such as sort operations and various aggregations such as algorithmic combinations. Some other productivity applications can be controlled to allow a user to generate and interact with tables. Such productivity applications may also include equation editors that allow a user to generate, configure, and interact with equations in the corresponding documents.

In order to manipulate these types of applications, a user normally provides an input to open a document (such as a spreadsheet). The user then provides an input, through a user interface, in order to manipulate the document. By way of example, a spreadsheet application surfaces a user interface that allows the user to provide inputs to insert, delete and modify values in the cells of a spreadsheet document. Similarly, the spreadsheet application allows the user to combine values using equations, to sort values in various portions of a spreadsheet document, among other things.

Some current productivity applications also allow users to undo operations that they have previously performed. For instance, some current spreadsheet applications maintain an "undo" stack which is a memory structure that stores undo operations that undo user revisions to the spreadsheet document in a time ordered (last-in-first-out) fashion. The spreadsheet application then provides an undo actuator on a user interface that allows the user to perform the undo operations identified on the undo stack.

The discussion above is merely provided for general background information and is not intended to be used as an aid in determining the scope of the claimed subject matter.

SUMMARY

A computing system runs a productivity application that maintains an integrated, time ordered revision/undo stack. Entries in the revision/undo stack identify revision operations that a user has made to a document and corresponding undo operations that can be executed to undo the revision operation. The computing system detects an undo input indicative of a user actuating un undo actuator to undo a previous operation, that is prior to a most current operation that the user has performed. An operational transform system identifies an undo operation in the undo stack, corresponding to the revision that the user selected in the revision/undo stack. The operational transform system traverses the revision/undo stack to identify subsequent operations that were performed subsequent to the previous operation, and identifies one or more transforms to be applied to the undo operation based upon the identified subsequent operations. The operational transform system then transforms the undo operation, using the transformation function, and applies the transformed undo operation to the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5A-5F show examples of a revision/undo stack.

DETAILED DESCRIPTION

As discussed above, many productivity applications maintain an undo stack of operations to undo revisions that a user has performed on a document. However, the undo stack is time ordered. Therefore, assume that a user makes a mistake on an initial operation. Assume that the user performs two subsequent operations after the initial operation, but then wishes to undo the initial operation to correct the mistake. In current systems, the user must often traverse the undo stack in time order, meaning that the user must undo the two subsequent operations before undoing the initial operation. Then, the user must repeat the two subsequent operations. Because the user must traverse the undo stack in time order, this can lead to inefficiencies and can be cumbersome.

Some current productivity applications also maintain a revision stream that is a time-ordered list of revisions that a user makes to a document.

The present description thus proceeds with respect to a system that allows a user to undo an operation, even after subsequent operations are performed, without first needing to undo the subsequent operations. An undo stack and a revision stream are integrated so that when a user selects an undo operation, the system traverses the revision stream identifying subsequent revisions that were made and applies a transformation to the undo operation, based upon the subsequent revisions that have been identified, to obtain a transformed undo operation. The transformed undo operation can then be applied against the document to properly undo the operation selected by the user, without undoing the subsequent operations.

Figure 1:
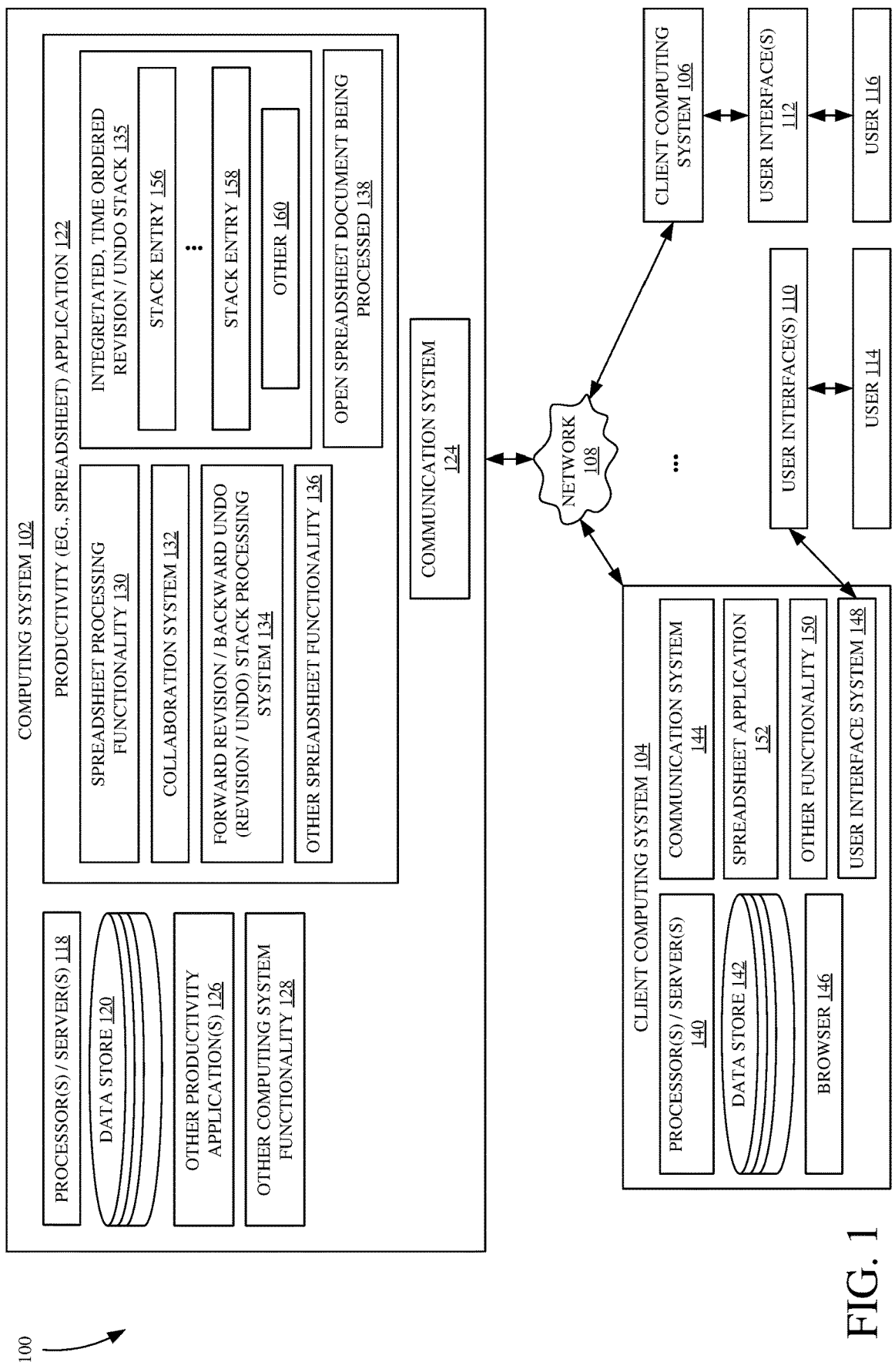
FIG. 1 is a block diagram of one example of a computing system architecture.

FIG. 1 is a block diagram of one example of a computing system architecture 100. Architecture 100 includes computing system 102 that is accessible by client computing systems 104-106 over network 108. Network 108 can be any of a wide variety of different types of networks such as a wide area network, a local area network, a near field communication network, a cellular communication network, or any of a wide variety of other networks or combinations of networks.

Client computing systems 104-106 are shown generating user interfaces 110-112, respectively, for interaction by users 114-116. User 114 illustratively interacts with user interfaces 110 in order to manipulate and control client computing system 104, and some portions of computing system 102. User 116 illustratively interacts with user interfaces 112 in order to control and manipulate client computing system 106 and some portions of computing system 102.

Before describing the overall operation of architecture 100 in more detail, a brief description of some of the items in architecture 100, and their operation, will first be provided. In one example, computing system 102 can include processors or servers 118, data store 120, productivity application 122, communication system 124, other productivity applications 126, and it can include other computing system functionality 128. Productivity application 122 could be any productivity application that enables functionality for manipulating things such as tables, equations, spreadsheets, etc. However, it is discussed herein as a spreadsheet application for the sake of example only. Thus, productivity application 122 illustratively includes spreadsheet processing functionality 130, collaboration system 132, forward revision/backward undo (revision/undo) stack processing system 134, revision/undo stack 135 (which can, itself, include a plurality of different stack entries 156-158 and other items 160), and other functionality 136. FIG. 1 also shows that, in one example, productivity application 122 has opened a spreadsheet document that is currently being processed. This open spreadsheet document is indicated by block 138 in FIG. 1.

Computing systems 104-106 may be similar or different. For purposes of the present description, it will be assumed that they are similar so that only client computing system 104 is described in more detail. In the example shown in FIG. 1, client computing system 104 includes one or more processors or servers 140, data store 142, communication system 144, browser 146, user interface system 148, and it can include other functionality 150. In one example, when client computing system 104 is using productivity application 122 in computing system 102 to process a spreadsheet, client computing system 104 can open an instance (or client component) 152 of a spreadsheet application. Changes to the spreadsheet being processed in spreadsheet application 152 can be sent over network 108 to productivity application 122 where they can be synchronized or otherwise incorporated into the open spreadsheet document 138. This reduces latency for a user 114 who is making revisions to a spreadsheet document, because those revisions can be made locally in the spreadsheet application 152 on client computing system 104 and be transmitted for reconciliation for the open spreadsheet document 138 over network 108, asynchronously. In another example, client computing system 104 uses browser 146 to access productivity application 122 and open spreadsheet document 130 so that a local spreadsheet application 152 is not needed. In yet another example, it may be that the spreadsheet application 152 is used by user 114 on client computing system 104, without access to a computing system 102. This may be the case in an example in which the spreadsheet application is a desktop application instead of a hosted application. The present description could just as easily proceed with respect to any or all of these different scenarios. However, for purposes of the present description, it will be assumed that a spreadsheet application 152 opens a local copy of the open spreadsheet document 138 so that document 138 can be processed on client computing system 104, based upon revisions input by user 114, to reduce latency. At some point, those revisions are transmitted over network 108 to productivity application 122, where they can be reconciled using collaboration system 132 with revisions by other users, using other client computing systems, for instance by user 116 using client computing system 106.

It will also be noted that the present description proceeds with respect to inputs being received from user 114 and client computing system 104. However, this is just one example and the inputs could be received from multiple users 114-116 using the multiple client computing systems 104-106. Such inputs are handled by collaboration system 132 so that they are processed by spreadsheet processing functionality 130 to execute the operations on the open spreadsheet document 138.

In one example, during operation, productivity application 122 receives inputs over network 108, via communication system 124, from client computing system 104, indicating changes or revisions to be made to the open spreadsheet document 138. These inputs are provided to spreadsheet processing functionality 130 which includes the logic for executing operations based upon the inputs. For instance, if user 114 provides an input indicating that user 114 wishes to add content to a cell in the open spreadsheet document 138, the spreadsheet processing functionality 130 executes that requested operation to add the desired content to the desired cell in the document 138.

When an input is received, indicating that an operation is to be performed on open spreadsheet document 138, forward revision/backward undo (revision/undo) stack processing system 134 generates a stack entry (such as stack entry 156) based upon the operation indicated by the received input. The revision/undo stack processing system 134 generates the entry to indicate the revision that user 114 is making to document 138, as well as to indicate an undo operation that can be performed to reverse that revision. For instance, if the requested operation is to add content X to cell Y in the open spreadsheet document 138, then system 134 generates a stack entry with a revision indicator that indicates that operation. Stack processing system 134 also generates an undo indicator in the stack entry that indicates an operation which would remove content X from cell Y in the open spreadsheet document 138. The same is true of more complex operations. For instance, if the requested operation is to sort a group of cells according to a specified sort criteria, then the forward revision indicator generated by stack processing system 134 identifies the sort operation, and the backwards undo indicator generated by stack processing system 134 indicates an operation that can be executed to reverse the sort operation. In one example, the entries 156-158 are placed on the revision/undo stack 135 in a time ordered fashion and arranged in a last-in-first-out configuration.

If user 114 wishes to undo a revision that was previously made to document 138, user 114 provides an input (an undo indication) through user interfaces 110 indicating this. The undo indication is provided to stack processing system 134 which then generates a representation of the revision/undo stack 135 so that it can be displayed or otherwise surfaced on user interfaces 110 for user 114. In one example, representations of the stack entries 156-158 are displayed in time order, and in an interactive fashion so that user 114 can select one of the entries to undo the corresponding revision. As is described in greater detail below with respect to FIG. 2, stack processing system 134 identifies the entry, corresponding to the revision that user 114 wishes to undo, in stack 135. System 134 identifies the undo operation in the stack entry. Stack processing system 134 then traverses the stack to identify stack entries corresponding to revisions that were made subsequent to the selected entry, and identifies any transformations that need to be made to the undo operation in the selected entry before the undo operation is applied to the open spreadsheet document 138. For instance, it may be that the undo operation in the selected stack entry identifies a cell where content is to be deleted. However, subsequent operations on the open document 138 may have moved the location of that cell in document 138. In that case, a transformation is executed on the undo operation to change the location in document 138 where the content is to be deleted, based upon the subsequent revisions identified by the subsequent stack entries in revision/undo stack 135.

At some point, it may be that user 114 closes the open spreadsheet document 138 within productivity application 122. In such a scenario, stack processing system 134 stores the revision/undo stack 135 and maintains it until the spreadsheet document 138 is reopened. Stack processing system 134 then loads the stored revision/undo stack 135, corresponding to document 138, back into memory so that user 114 can continue to undo revisions that were made even before the spreadsheet document 138 was closed. Similarly, stack processing system 134 allows users to undo revisions even where the user did not perform the original revision that the user wishes to undo. For instance, if user 116 opens the spreadsheet document 138, user 116 can undo revisions that were made by other users (such as user 114).

Figure 2:
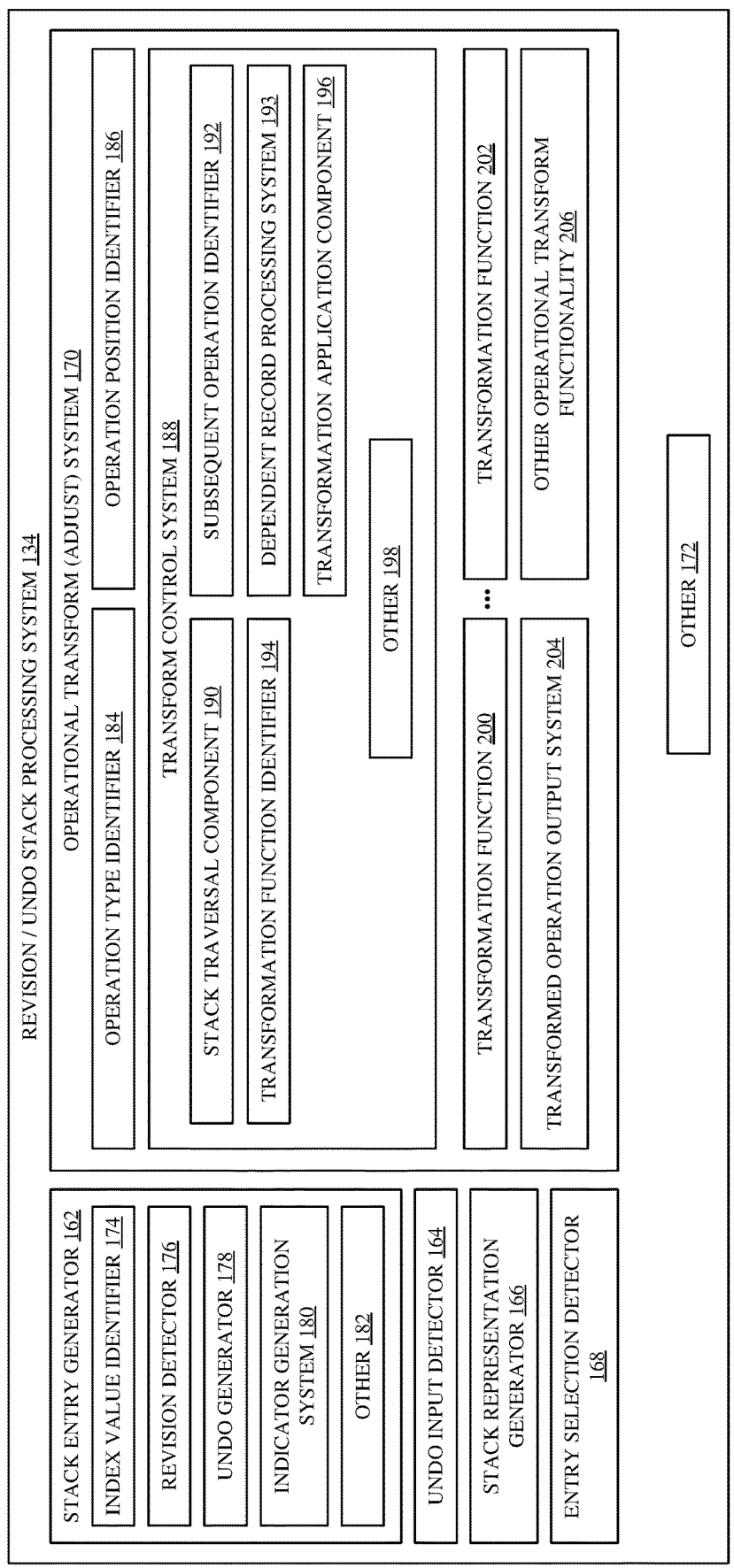
FIG. 2 is a block diagram showing one example of revision/undo stack processing system in more detail.

FIG. 2 is a block diagram showing one example of revision/undo stack processing system (or stack processing system) 134 in more detail. Stack processing system 134 illustratively includes stack entry generator 162, undo input detector 164, stack representation generator 166, entry selection detector 168, operational transform (adjust) system 170, and it can include other items 172. In the example illustrated in FIG. 2, stack entry generator 162 can include index value identifier 174, revision detector 176, undo generator 178, indicator generation system 180, and it can include other items 182. Operational transform (adjust) system 170, in the example shown in FIG. 2, can include operation type identifier 184, operation position identifier 186, transform control system 188 (which, itself, may include stack traversal component 190, subsequent operation identifier 192, dependent record processing system 193, transformation function identifier 194, transformation application component 196, and other items 198), a set of transformation functions 200-202, transformed operation output system 204, and it can include other operational transform functionality 206. Prior to describing the operation of revision/undo stack processing system 134 in more detail, a brief description of some of the items in stack processing system 134, and their operation, will first be described.

Stack entry generator 162 illustratively generates the stack entries in revision/undo stack 135, as operations are performed on the open spreadsheet document 138. For instance, as operator 114 interacts with user interface 110 to indicate that the operator wishes to make a revision to the open spreadsheet document 138, the stack entry generator 162 generates a stack entry based upon that revision. Index value identifier 174 generates or identifies an index value for the entry. The index value may, for instance, be a timestamp, a sequential identifier, etc. Revision detector 176 detects or identifies the particular revision that is to be made to the spreadsheet document 138 based upon the input from user 114. For instance, the revision may be to add content to a particular cell in the spreadsheet document 138, to delete content from a cell, to sort different cells, etc. Undo generator 178 then generates an undo indicator for the corresponding stack entry that identifies an operation that will undo the revision made by user 114. For instance, if the revision is to add content to a cell, then the undo generator 178 identifies, as an undo operation, an operation that will remove that content from the same cell. Indicator generation system 180 generates an indicator for the index value, the detected revision, and the generated undo operation and places the indicators in a stack entry in the revision/undo stack 135. FIG. 5A, for instance, shows one example of a stack entry 208 that can be generated by stack entry generator 162. Stack entry 208 illustratively has an entry number 210, a forward revision indicator 212, a backward undo indicator 214, and it can include other items 216. The entry number portion 210 will illustratively include the index generated by index value identifier 174. Forward revision indicator 212 illustratively includes a revision indicator that indicates the revision operation that is identified by revision detector 178. Backward undo indicator portion 214 illustratively includes an indicator that identifies the undo operation, that will undo the revision identified in portion 212.

Returning again to FIG. 2, assume that user 114 has made three revisions to the open spreadsheet document 138, and assume further that stack entry generator 162 has generated a separate stack entry corresponding to each of those revisions. Now assume that user 114 wishes to undo the first revision and actuates an actuator on a user interface 110 indicating that the user wishes to perform an undo operation. In such an example, the user input is provided through network 108 and communication system 124 to undo input detector 164 which detects the input indicating that user 114 wishes to perform an undo operation. Stack representation generator 164 then retrieves the revision/undo stack 135 corresponding to the open spreadsheet document 138 and generates a stack representation of that stack, showing the various time-ordered stack entries, or a portion of them, so that they can be displayed on a user interface 110 for user 114. The stack representation can be sent by network 108 to client computing system 104 where it is displayed to user 114 on user interface 110.

In one example, the stack representation is interactive so that user 114 can select one of the stack entries corresponding to the revision that the user wishes to undo. Continuing with the example in which the user has made three revisions to the document and wishes to undo the first of the three revisions, the user will select the oldest stack entry, corresponding to the first operation that user 114 performed on the open spreadsheet document 138. It will of course be noted that the user could pick other entries in the stack and the user could select entries corresponding to revisions that other users made (such as a revision that user 116 may have made) to the open spreadsheet document 138. The present discussion proceeds with respect to user 114 selecting the entry corresponding to the first operation that user 114 made to the open spreadsheet document 138.

Entry selection detector 168 detects that the user has selected the corresponding stack entry and provides an indication of the selected stack entry to operational transform system 170. Operation type identifier 184 identifies the type of operation that is to be performed to undo the revision. For instance, operation type identifier 184 can parse or otherwise examine the selected stack entry 208 to identify the backward undo indicator in portion 214 of stack entry 208 (shown in FIG. 5A) to identify the particular undo operation that is to be executed. Operation position identifier 186 identifies the position in open spreadsheet document 138 where the undo operation is to be performed, as indicated by the undo indicator 114.

It should be noted, however, that the position may have changed from that listed in the selected stack entry because a subsequent operation may have moved the position of that information, in spreadsheet document 138. For instance, assume that the first revision performed by user 114 is to insert content in cell A1. Assume, however, that the second revision is to insert a cell prior to A1 and insert additional information into that cell. In such an example, the previous cell A1 may now be located at position A2 in the spreadsheet document 138. Therefore, the undo operation (which would remove the content from cell A1) needs to be adjusted based upon the subsequent operation which changed the location of cell A1 to cell A2.

Therefore, stack traversal component 190 in transform control system 188 traverses the revision/undo stack 135 and subsequent operation identifier 192 identifies the subsequent operations that were made after the revision that user 114 wishes to undo. Based upon the identified subsequent operations, transformation function identifier 194 identifies one or more transformation functions 200-202 which may be executed on the undo operation to adjust it based upon the subsequent operations that were performed on spreadsheet document 138.

In addition, dependent record processing system 193 may track dependent revisions that need to first be undone, before a given revision can be undone. For instance, assume that a user edits cell A1 in a spreadsheet document and then makes a subsequent revision that deletes row 1 in the spreadsheet document. In such a scenario, the edit revision cannot be undone because the location it applies to no longer exists. Therefore, dependent record processing system 193 tracks the dependency between such revisions and generates an undo operation that first reverses operations upon which the revision to be undone depends. For instance, dependent record processing system 193 tracks the dependency indicating that, the undo operation that reverses the edit to cell A1 is dependent on an undo operation that reverses the delete revision. Therefore, dependent record processing system 193 links the dependent undo operations by indicating that for the edit revision to be reversed, the delete revision must first be reversed and then the edit revision can be reversed. Dependent record processing system 193 can thus identify multiple undo operations and a sequence in which they are to be performed.

In one example, a transformation function 200 is selected to adjust the position of the undo operation before the undo operation is applied to the spreadsheet document 138. Transformation application component 196 applies that transformation to the undo operation to obtain the transformed or adjusted undo operation. Continuing with the present example, the transformation application component 196 applies the transformation function that adjusts the position of the undo operation from occurring in cell A1 to occurring in cell A2. The transformed undo operation output system 204 then outputs the transformed undo operation to spreadsheet processing functionality 130 (shown in FIG. 1) where the transformed undo operation can be applied to the open spreadsheet document 138. Continuing with the present example, applying the adjusted operation results in the content being deleted from cell A2, instead of cell A1. Thus, user 114 is able to undo revisions, out of order, without first undoing subsequent revisions.

It will be noted that, in one example, operation transform (adjust) system 170 may use transform control system 188 to execute a control algorithm that may be stored in data store 120 or elsewhere and that determines which undo operations are to be transformed against the operations used to make revisions to document 138 and may thus identify the particular transformation functions 200-202 that are to be called.

The transformation control system 188 can identify the transformation functions 200-202 using a rules-based algorithm or a model or in other ways. The transformation functions 200-202 can be functions stored in an indexed data structure in memory or they can be stored elsewhere and in other structures. The transformation functions 200-202 can be embodied in one or more models or in other ways. The transformation functions 200-202, when executed on an undo operation, transform the undo operation by changing or modifying the undo operation or otherwise adjusting the undo operation.

Transformation control system 188 may identify multiple different transformation functions that need to be applied to the undo operation, before it is executed on the open spreadsheet document 138, and in such examples, transformation control system 188 also identifies the order or sequence in which those transformation functions are to be applied to the undo operation. The multiple different transformation functions and the sequence of applying them may be based on dependencies among the revisions in the revision/undo stack 135.

The transformation functions 200-202 will vary based upon application and the types of properties to be used. For instance, the transformation functions 200-202 can include, without limitation, inclusion transformation functions which transform an operation, against another operation, in such a way that the impact of the latter operation is effectively included. The transformation functions can also include exclusion transformation functions which transform an operation against another operation in such a way that the impact of the latter operation is effectively excluded. Similarly, the transformation functions 200-202 can be configured to exhibit one or more of convergence properties and inverse properties. The configuration of the transform control system 188 and the various transformation functions 200-202 may also vary based upon the data model that defines the way data objects in a document (such as document 138) are addressed by operations, and the operation model that defines the set of operations that can be directly transformed by functions 200-202. By way of example, if the productivity application 122 enables m different operations, then m*m transformation functions may be used so that each of the m operations can be transformed against each of the other m operations which may have been performed subsequent to a selected undo operation.

Figure 3A:
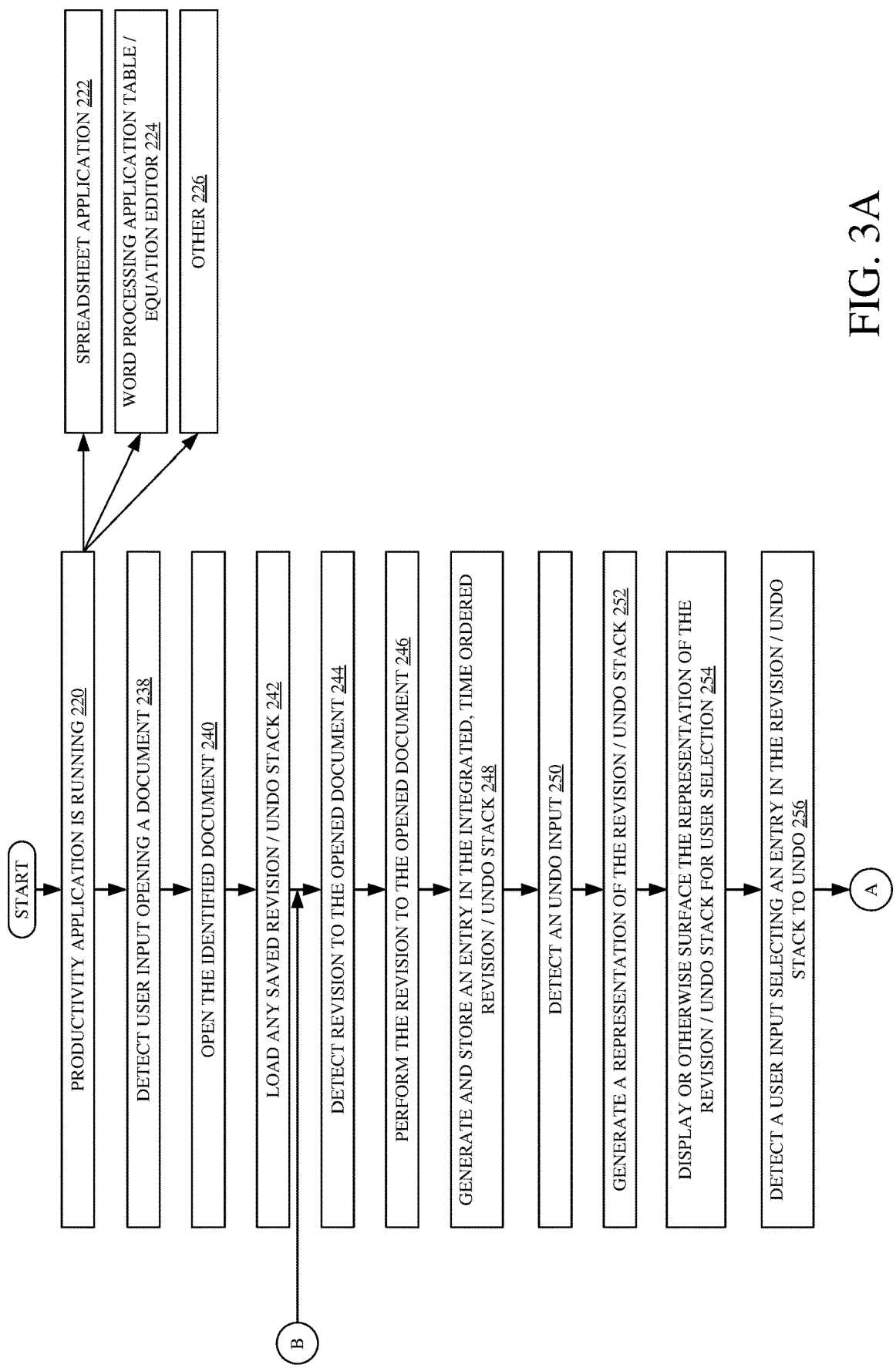
FIGS. 3A and 3B (collectively referred to herein as FIG. 3) show a flow diagram illustrating one example of the operation of the computing system architecture in FIG. 1, in generating a revision/undo stack and in processing an undo request.
Figure 3B:
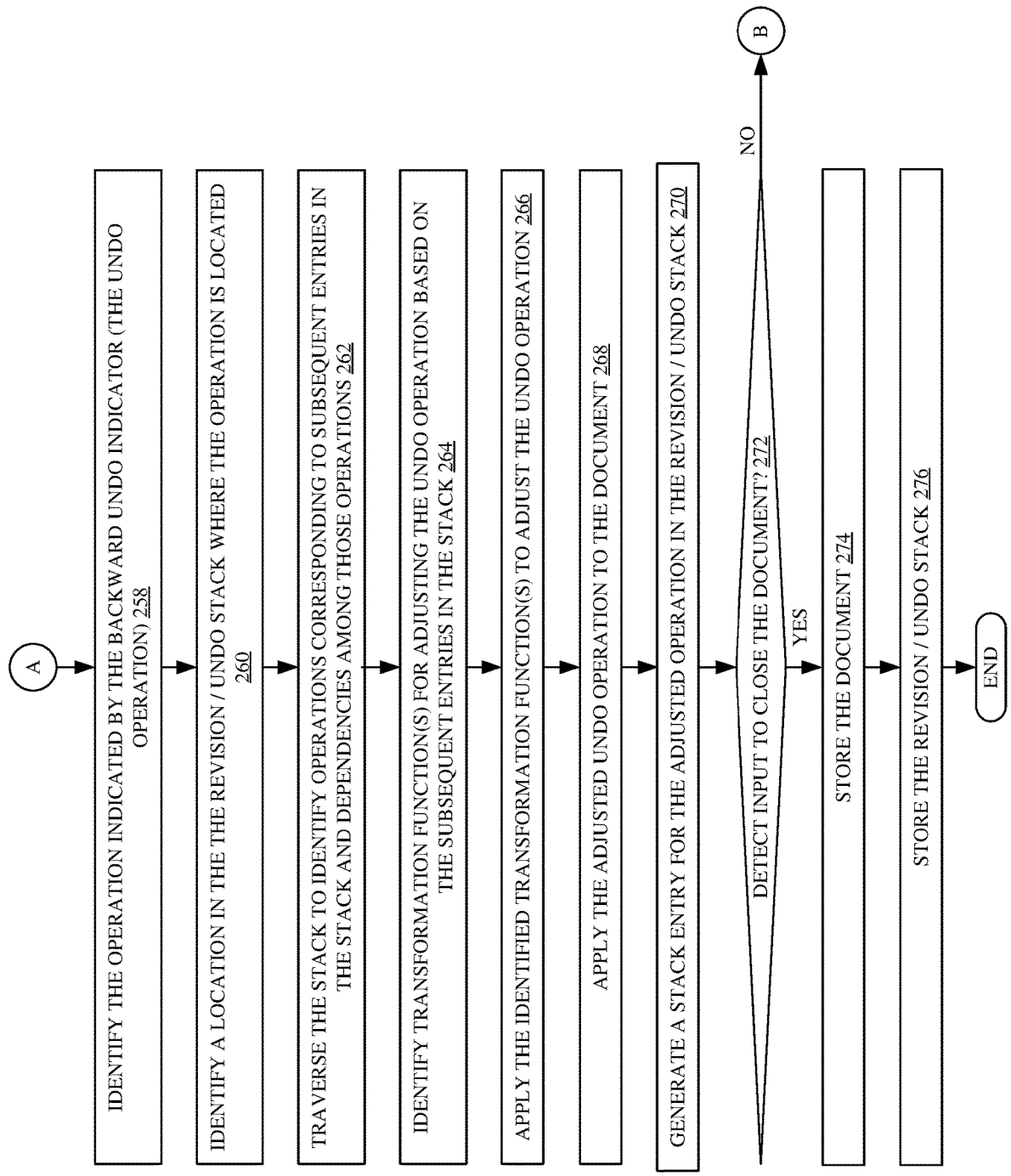

FIGS. 3A and 3B (collectively referred to herein as FIG. 3) show a flow diagram illustrating one example of the operation of computing system architecture 100 in generating revision/undo stack 135 and processing an undo operation. It is first assumed that the productivity application 122 is running. This is indicated by block 220 in the flow diagram of FIG. 3. In one example, the productivity application is a spreadsheet application 222. The productivity application may also be a word processing application, a slide presentation application, or another application, with table functionality and/or an equation editor, as indicated by block 224. The productivity application can be another application as well, and this is indicated by block 226.

At some point, the spreadsheet processing functionality 130 detects a user input opening a spreadsheet document 138. Detecting the user input is indicated by block 238 in the flow diagram of FIG. 3. The present discussion will proceed with respect to productivity application 122 being a spreadsheet application, although this is done for the sake of example only.

For instance, a user 114 may provide an input on user interface 110 indicating that the user wishes to open a spreadsheet document 138. This input may be transmitted by communication system 144 to spreadsheet processing functionality 130 which opens spreadsheet document 138 (e.g., by retrieving it from data store 120 or elsewhere). Opening the identified document is indicated by block 240 in the flow diagram of FIG. 3. Revision/undo stack processing system 134 also loads any saved revision/undo stack 135 corresponding to the document that was just opened into memory so it can be used along with document 138. Loading the revision/undo stack 135 is indicated by block 242 in the flow diagram of FIG. 3.

User 114 then illustratively begins operating on the opened spreadsheet document 138. Again, this can be done by interacting with a copy of spreadsheet document 138 opened on client computing system 104, where the interactions with that document are transmitted to productivity application 122 on computing system 102, or it can be done with respect to user 114 interacting with spreadsheet document 138, itself, over network 108 (such as by using browser 136 or otherwise). User 114 illustratively provides an input to revise the opened spreadsheet document 138. Revising the document is indicated by block 244 in the flow diagram of FIG. 3. For instance, user 114 may provide an input adding content or structure (cells, rows, columns, etc.) at a certain location in the spreadsheet document 138, deleting content or structure, revising existing content or structure, performing a sort operation or an aggregation operation, or any of a wide variety of other operations.

An indication of the revision input by user 114 is provided to spreadsheet processing functionality 130 which performs an operation to make the revision on spreadsheet document 138. This is indicated by block 246 in the flow diagram of FIG. 3. Either at the same time that the operation is performed or before the operation is performed, or after it is performed, stack entry generator 162 in revision/undo stack processing system 134 generates a stack entry in revision/undo stack 135 corresponding to the revision that user 114 is performing on the spreadsheet document 138. Generating and storing a stack entry in the integrated, time ordered revision/undo stack 135 is indicated by block 248 in the flow diagram of FIG. 3. Generating an entry in stack 135 is described in greater detail below with respect to FIG. 4. Suffice it to say, at this point, that the stack entry includes the entry number 210 (shown in FIG. 5A) the forward revision indicator 212 indicating the revision that user 114 is performing on document 138, and the backward undo indicator 114 indicating the undo operation that will reverse the revision operation.

At some point, user 114 provides an input indicating that user 114 wishes to perform an undo operation. Undo input detector 164 detects such an input, as indicated by block 250 in the flow diagram of FIG. 3. Stack representation generator 166 then generates a representation of the revision/undo stack 135 so that it can be rendered or otherwise surfaced for interaction by user 114. Generating a representation of the revision/undo stack is indicated by block 252 in FIG. 3, and displaying or otherwise surfacing the representation for user interaction is indicated by block 254 in FIG. 3. Thus, at block 254, the various revisions that have been made to spreadsheet document 138, that user 114 can undo, are displayed or otherwise surfaced so that they can be selected by user 114. In this way, the user can select one of the revisions to undo it. This can be done, for instance, by the user actuating a user actuatable display element such as a link or button corresponding to a given revision in the rendered revision/undo stack 135, or in other ways.

Entry selection detector 168 then detects a user input selecting an entry in the revision/undo stack 135, corresponding to a revision that the user 114 wishes to undo. This is indicated by block 256 in the flow diagram of FIG. 3. The stack entry (or an indicator identifying the stack entry) corresponding to the selected revision is then provided from stack 135 to operational transform system 170. Operation type identifier 184 then accesses the selected stack entry to identify the type of undo operation indicated by the backward undo indicator 214 in the selected stack entry, and operation position identifier 186 identifies the position of the selected stack entry in the revision/undo stack 135. Identifying the type of the undo operation is indicated by block 258 and identifying the location of the selected stack entry in revision/undo stack 135 is indicated by block 260.

Stack traversal component 190 then traverses the revision/undo stack 135 and subsequent operation identifier 192 identifies stack entries corresponding to revisions that were performed subsequent to the revision corresponding to the selected stack entry (e.g., subsequent operation identifier 192 identifies stack entries that are later than the selected stack entry). Dependent record processing system 193 identifies dependencies among the revisions represented by the stack entries identified by subsequent operation identifier 192. From those stack entries and dependencies, the subsequent operation identifier 192 identifies revisions that were performed subsequent to the revision that user 114 wishes to undo. Traversing the stack to identify the revisions corresponding to subsequent stack entries, and dependencies among those revisions, is indicated by block 262 in the flow diagram of FIG. 3. Based upon the revisions identified by the forward revision indicators 212 in the subsequent stack entries, and any dependencies among those revisions, transformation function identifier 194 identifies transformation functions 200-202 that are used to adjust the undo operation. This is indicated by block 264. Where more than one of the transformation functions 200-202 are to be applied to the undo operation, then those multiple transformation functions are identified, and a sequence in which they are to be applied (if there is one) is identified as well. This is done by transformation function identifier 194.

Once the transformation functions are identified, and any sequence is also identified, then transformation application component 196 applies the identified transformation functions to adjust the undo operation so that the adjusted undo operation can be accurately applied against the open spreadsheet document 138 without undoing any of the subsequent revisions in the process. This is indicated by block 266 in the flow diagram of FIG. 3. Transformed operation output system 204 then outputs the transformed (or adjusted) undo operation and provides it to spreadsheet processing functionality 130. Spreadsheet processing functionality 130 applies the transformed undo operation against the spreadsheet document 138 to perform the desired undo operation. Applying the undo operation against the spreadsheet document is indicated by block 268 in the flow diagram of FIG. 3. Revision/undo stack processing system 134 then generates a stack entry corresponding to the adjusted undo operation and stores the stack entry in the revision/undo stack 135. This is indicated by block 270 in the flow diagram of FIG. 3.

Until operation 114 provides an input to close document 138, as indicated by block 272 in the flow diagram of FIG. 3, processing reverts to block 244 where application 122 can detect additional revisions to the opened spreadsheet document 138. If, however, at block 272, user 114 provides an input to close the spreadsheet document, then document 138 is closed and stored and revision/undo stack processing system 134 stores the revision/undo stack 135, corresponding to the spreadsheet document 138, as well. This is done so that when spreadsheet document 138 is reopened, its corresponding revision/undo stack 135 can also be reopened so that a user can undo operations reflected in the revision/undo stack 135, at that time. Storing the spreadsheet document 138 is indicated by block 174 in the flow diagram of FIG. 3 and storing the corresponding revision/undo stack 135 is indicated by block 276 in the flow diagram of FIG. 3.

Figure 4:
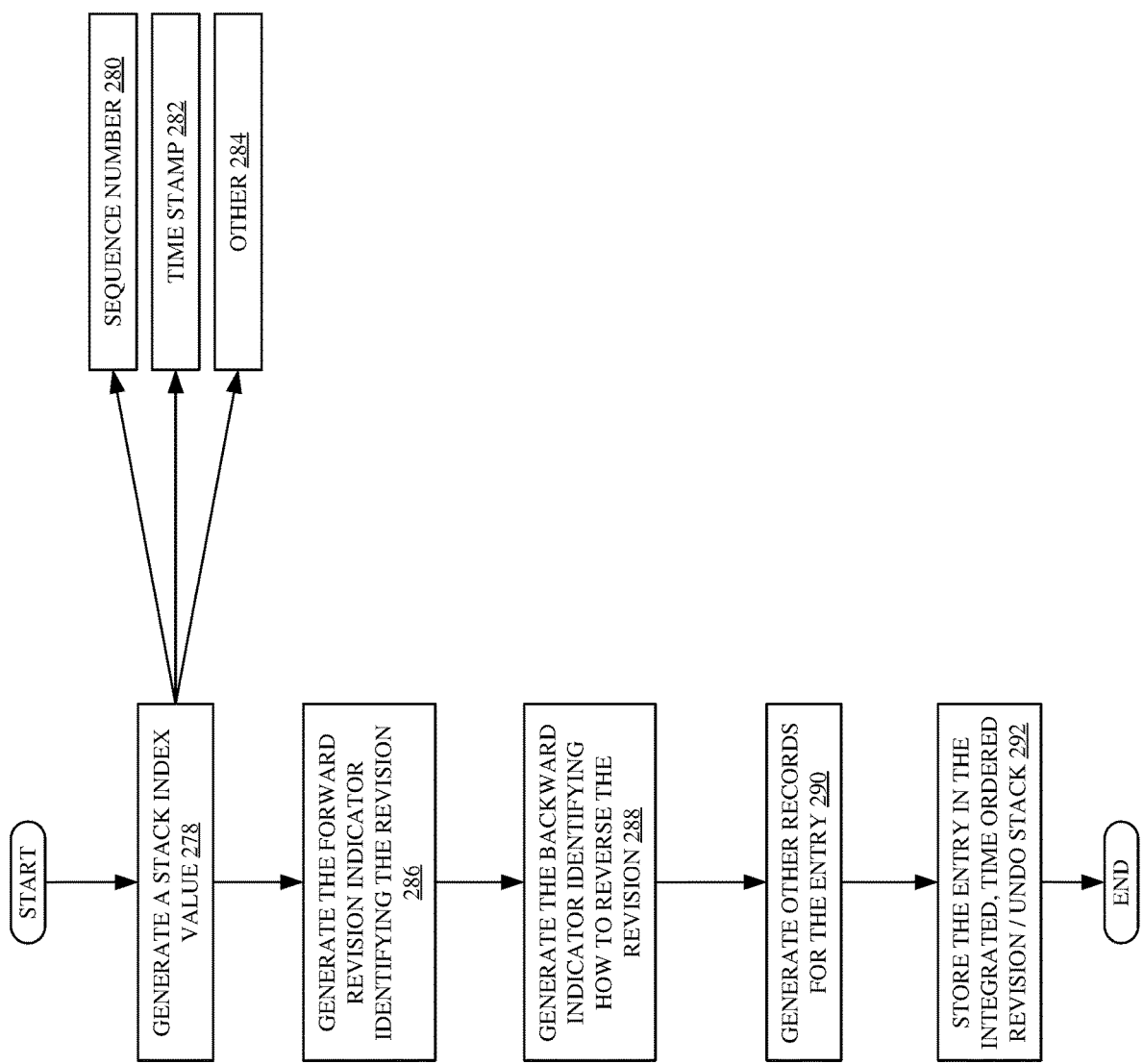
FIG. 4 is a flow diagram illustrating one example of how a revision/undo stack entry is generated.

FIG. 4 is flow diagram illustrating one example of the operation of stack entry generator 162 in generating a stack entry for a revision input performed by user 114 with respect to a spreadsheet document 138. Thus, the flow diagram illustrated in FIG. 4 corresponds to one example of block 248 in FIG. 3. Index value identifier 174 first generates a stack index value for the stack entry. This is indicated by block 278 in the flow diagram of FIG. 4. The index value may be a sequential number (such as an ever increasing number) 280. The index value may be a timestamp 282, or another index value 284 that indicates a time order of entries in the stack. Revision detector 176 identifies the forward revision that user 114 is making on document 138 and indicator generation system 180 generates an indicator that identifies that forward revision. Generating the forward revision indicator identifying the revision is indicated by block 286 in the flow diagram of FIG. 4.

Undo generator 178 then identifies an undo operation that may be performed in order to undo the forward revision. Indicator generation system 180 generates an indicator that identifies the undo operation as indicated by block 288 in the flow diagram of FIG. 4. Stack entry generator 162 can generate other records for the entry as well, and this is indicated by block 290. Stack entry generator 162 then stores the stack entry in the integrated, time ordered revision/undo stack 135. This is indicated by block 292 in the flow diagram of FIG. 4.

At this point, an example may be helpful.

TABLE 1

| A<br>PURCHASE ORDER | B<br>DAYS TIL DUE | C<br>PRICE |
|---|---|---|
| Jim | −5 | $1.00 |
| Sherman | 5 | $12.00 |

TABLE 1-continued

| A<br>PURCHASE ORDER | B<br>DAYS TIL DUE | C<br>PRICE |
|---|---|---|
| Sanjay | 3 | $6.00 |
| Doug | 2 | $2.00 |
| Nick | 30 | $5.00 |
| Dmitri | 10 | $2.00 |
| Ying | 7 | $1.00 |

Table 1 shows one example of a spreadsheet which includes columns A, B and C. The spreadsheet shown in Table 1 also includes rows 1-8. It can be seen that values have already been entered in each of the cells in the spreadsheet (cells A1-C8).

TABLE 2

| A<br>PURCHASE ORDER | B<br>DAYS TIL DUE | C<br>PRICE |
|---|---|---|
| Jim | −5 | $1.00 |
| Sherman | 5 | $12.00 |
| Sanjay | 33 | $6.00 |
| Doug | 2 | $2.00 |
| Nick | 30 | $5.00 |
| Dmitri | 10 | $2.00 |
| Ying | 7 | $1.00 |

Table 2 now shows that cell B4 has been revised from a value of 3 to a value of 33. For the sake of the present example, it is assumed that this revision is a mistake, and it will be the revision that will later be selected to be undone. In any case, when the user changes the value in cell B4 from 3 to 33, stack entry generator 162 generates a stack entry for revision/undo stack 135 as shown in FIG. 5B. It can be seen that, for purposes of the present discussion, this is the first entry in the stack (although there would have been prior entries corresponding to the operations populating the spreadsheet shown in Tables 1 and 2) and the forward revision indicator shows that, for cell B4, the value was changed from 3 to 33. Undo generator 178 then identifies an undo operation so that the backward undo indicator indicates that, to undo the revision, then in cell B4, the value is to be changed from 33 to 3. Now assume that a user performs another operation revising the value in cell B8 from 7 to 9. In that case, the spreadsheet will be changed to that shown in Table 3 below.

TABLE 3

| A<br>PURCHASE ORDER | B<br>DAYS TIL DUE | C<br>PRICE |
|---|---|---|
| Jim | −5 | $1.00 |
| Sherman | 5 | $12.00 |
| Sanjay | 33 | $6.00 |
| Doug | 2 | $2.00 |
| Nick | 30 | $5.00 |
| Dmitri | 10 | $2.00 |
| Ying | 9 | $1.00 |

Stack entry generator 162 then generates another stack entry corresponding to that revision. FIG. 5C shows that a stack entry 2 has been entered in which the forward revision indicator indicates that, in cell B8, the value of 7 is to be changed to the value of 9. The backward undo indicator indicates that, in cell B8, the value of 9 is to be changed to a value of 7 to perform the undo operation.

Now assume that a user performs a sort operation on the spreadsheet to sort the range of cells based upon the values in column B, in ascending order. In that case, the spreadsheet will look like that illustrated in Table 4 below.

TABLE 4

| A<br>PURCHASE ORDER | B<br>DAYS TIL DUE | C<br>PRICE |
|---|---|---|
| Jim | −5 | $1.00 |
| Doug | 2 | $2.00 |
| Sherman | 5 | $12.00 |
| Ying | 9 | $1.00 |
| Dmitri | 10 | $2.00 |
| Nick | 30 | $5.00 |
| Sanjay | 33 | $6.00 |

Stack entry generator 162 generates a stack entry corresponding to the sort operation as well, and this is illustrated in FIG. 5D. FIG. 5D now shows that the stack has an entry number 3 where the forward revision indicator indicates that the cells in the range A1-C8 are sorted by B in ascending order. The backward undo indicator illustratively shows an undo record that indicates how to undo that sort operation.

Next assume that a user modifies cell B6 to change the value of 10 to the value of 20. In that case, the spreadsheet will look like that illustrated in Table 5 below.

TABLE 5

| A<br>PURCHASE ORDER | B<br>DAYS TIL DUE | C<br>PRICE |
|---|---|---|
| Jim | −5 | $1.00 |
| Doug | 2 | $2.00 |
| Sherman | 5 | $12.00 |
| Ying | 9 | $1.00 |
| Dmitri | 20 | $2.00 |
| Nick | 30 | $5.00 |
| Sanjay | 33 | $6.00 |

Again, stack entry generator 162 generates a stack entry for the revision, and this is indicated in FIG. 5E. FIG. 5E shows that the revision/undo stack now includes a fourth entry in which the forward revision indicator shows that, in cell B6, the value of 10 is to be changed to 20. The backward undo indicator indicates that, in cell B6, the value of 20 is changed to 10 in order to undo the revision.

Now assume that a user has changed cell B7 from a value of 30 to a value of 5. After that operation, the spreadsheet will look like that illustrated in Table 6 below.

TABLE 6

| A<br>PURCHASE ORDER | B<br>DAYS TIL DUE | C<br>PRICE |
|---|---|---|
| Jim | −5 | $1.00 |
| Doug | 2 | $2.00 |
| Sherman | 5 | $12.00 |
| Ying | 9 | $1.00 |
| Dmitri | 20 | $2.00 |
| Nick | 5 | $5.00 |
| Sanjay | 33 | $6.00 |

Again, stack entry generator 162 generates a stack entry for that operation, and this is illustrated in FIG. 5F. FIG. 5F shows that the revision/undo stack has an entry number 5 where the forward revision indicator indicates that, in cell B7, the value of 30 was changed to a value of 5. The backward undo indicator shows that, in order to undo the revision, then in cell B7, the value of 5 is to be changed to a value of 30.

Now assume user 114 provides an input indicating that the user wishes to undo the first revision (represented by stack entry number 1 in the revision/undo stack), without undoing revisions 2-5. In that case, operation type identifier 184 identifies the type of the undo operation (changing a value in a cell from 33 to a value of 3), and operation position identifier 186 identifies the position where the undo operation is to be performed (cell B4) and the position of the stack entry corresponding to that operation as being entry number 1 in the stack 135. Stack traversal component 190 then traverses the subsequent stack entries in the stack and subsequent operation identifier 192 identifies each of the subsequent operations performed on the spreadsheet and represented by the subsequent stack entries, after that represented by entry number 1 in the spreadsheet. Transformation functionality identifier 194 identifies a transformation function indicating that the undo operation will need to be transformed because of the sort operation corresponding to entry number 3 in the revision/undo stack. It can be seen that due to the sort operation, the undo operation which indicates that cell B4 is to be changed from 33 to 3 will need to be adjusted so that it now indicates that the cell B8 will need to be changed from 33 to 3. The adjusted undo operation will thus appear as follows:

B8, 33 to 3

This adjusted undo operation is then provided to spreadsheet processing functionality 130 which executes the adjusted undo operation against the spreadsheet so that it now looks like that illustrated in Table 7 below.

TABLE 7

| A<br>PURCHASE ORDER | B<br>DAYS TIL DUE | C<br>PRICE |
|---|---|---|
| Jim | −5 | $1.00 |
| Doug | 2 | $2.00 |
| Sherman | 5 | $12.00 |
| Ying | 9 | $1.00 |
| Dmitri | 20 | $2.00 |
| Nick | 5 | $5.00 |
| Sanjay | 3 | $6.00 |

Stack entry generator 162 generates a stack entry corresponding to the undo operation and adds it to the revision/undo stack 135 as well.

It can thus be seen that the present system maintains an integrated, time ordered stack that represents revision operations and corresponding undo operations. When a user provides an input indicating that the user wishes to perform an undo operation, an operational transform system traverses the revision/undo stack to identify subsequent revisions and to identify transform functions that are to be applied against the undo operation based upon any subsequent revisions that were performed on the underlying document. The transformed undo operation can then be executed against the document to undo the revision, without needing to undo any of the subsequent revisions.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
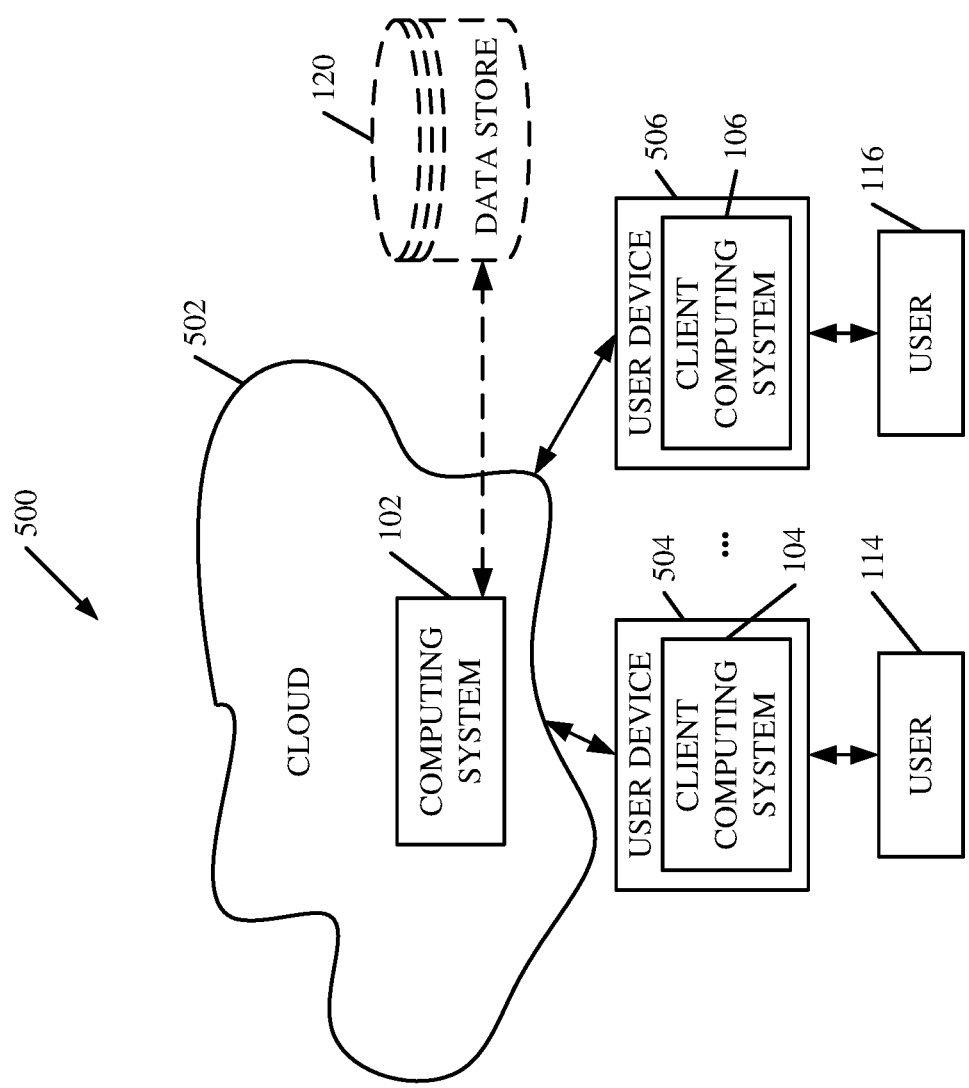
FIG. 6 is a block diagram showing one example of the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 102 can be located in cloud 502 (which can be public, private, or a combination where portions are public while others are private). Therefore, user 114 and 116 use user devices 504 and 506 to access those systems through cloud 502.

FIG. 6 also depicts another example of a cloud architecture. FIG. 6 shows that it is also contemplated that some elements of computing system 102 can be disposed in cloud 502 while others are not. By way of example, data store 120 can be disposed outside of cloud 502, and accessed through cloud 502. Regardless of where they are located, they can be accessed directly by devices 504 and 506, through a network (such as a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
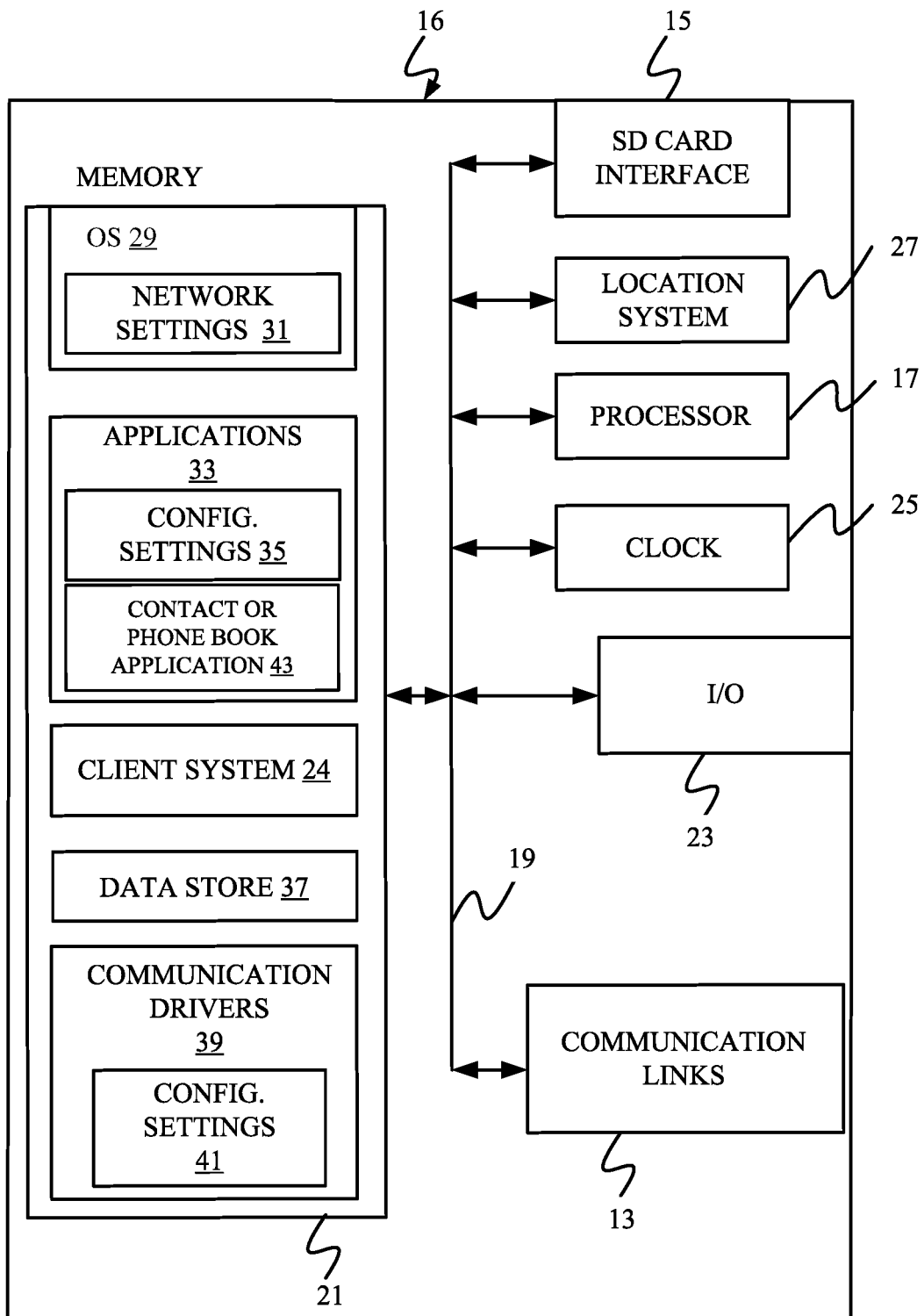
FIGS. 7-9 show examples of mobile devices that can be used in the architectures illustrated in the previous figures.
Figure 8:
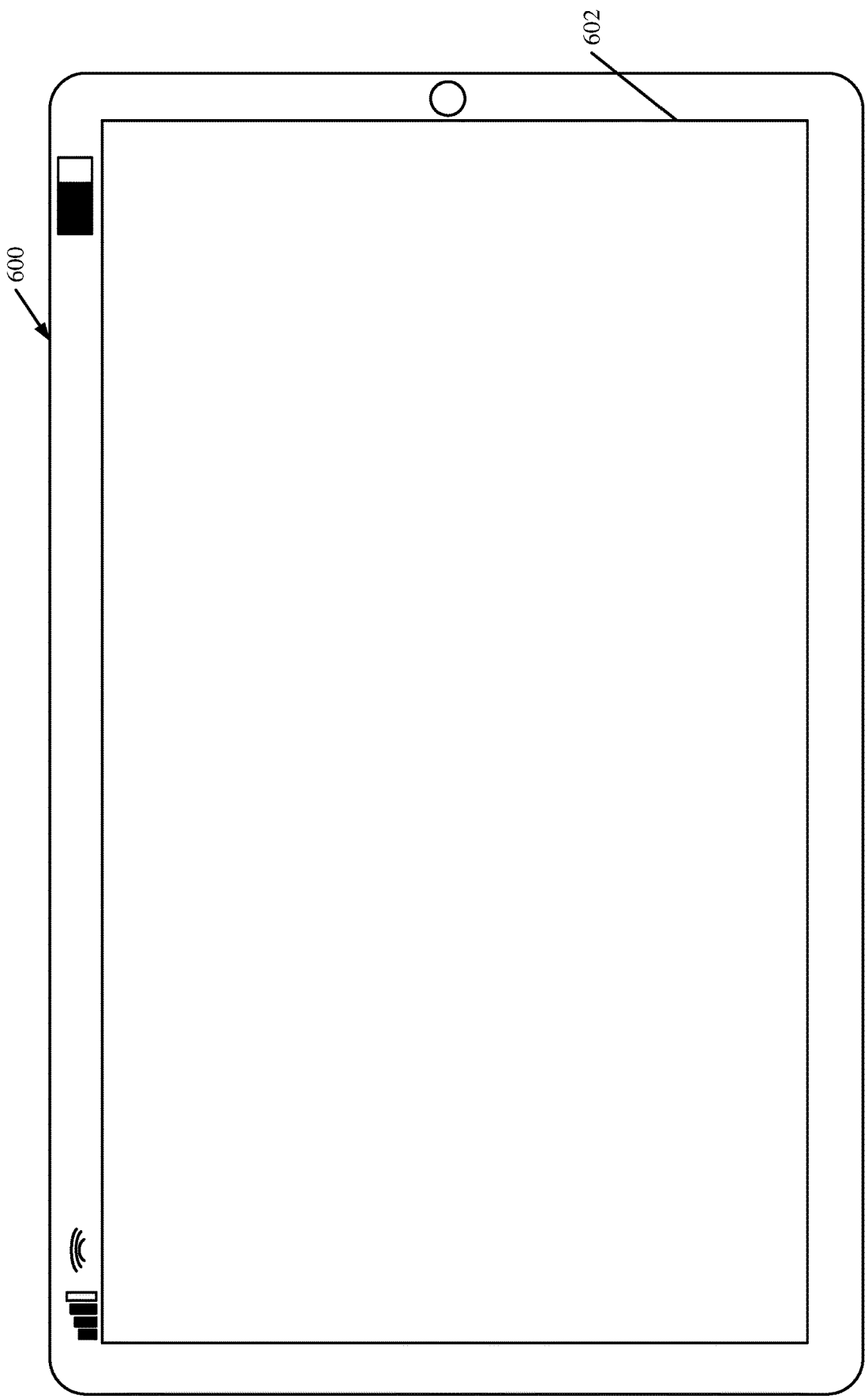
Figure 9:
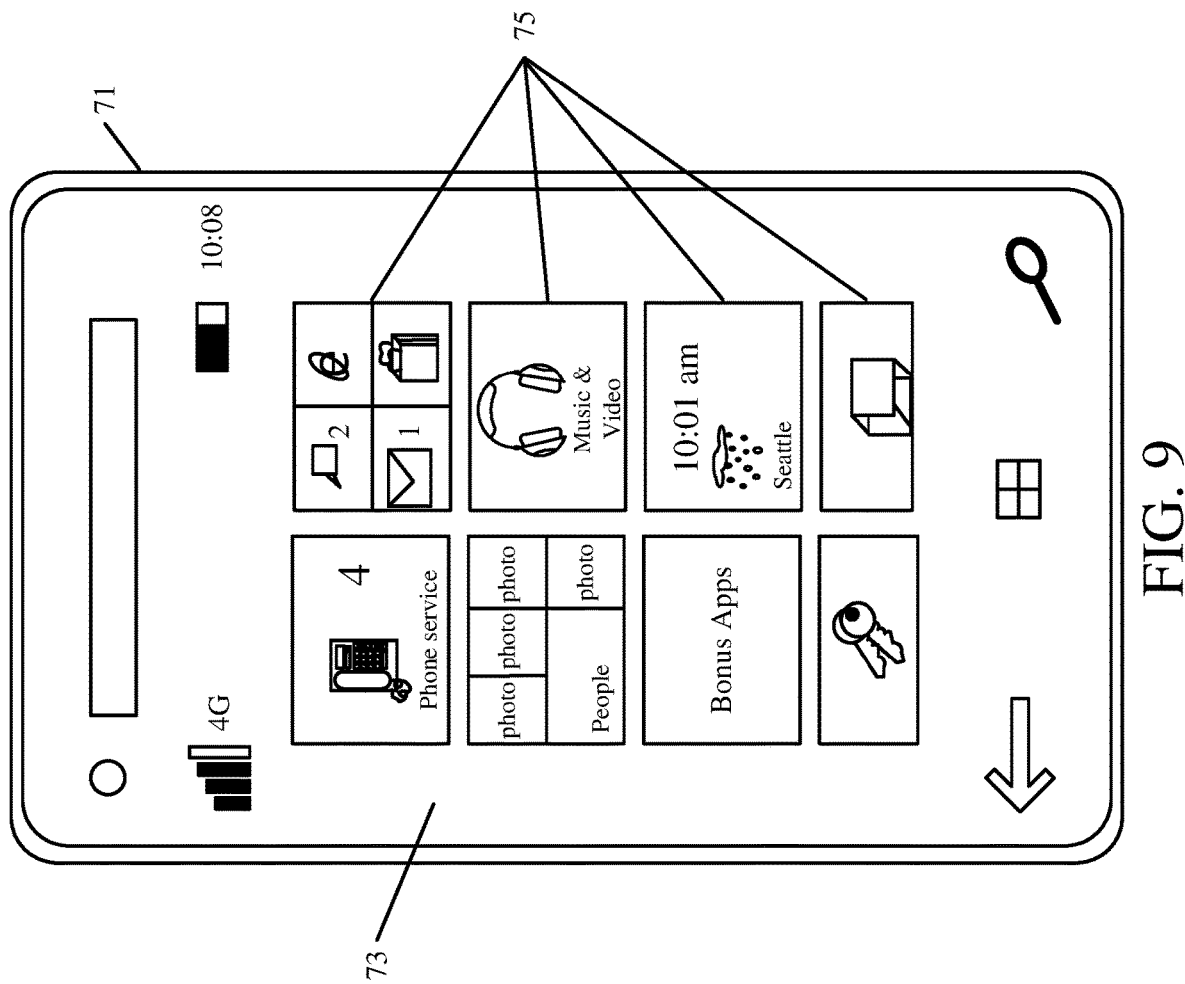

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components computing system 102 or user device 504 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
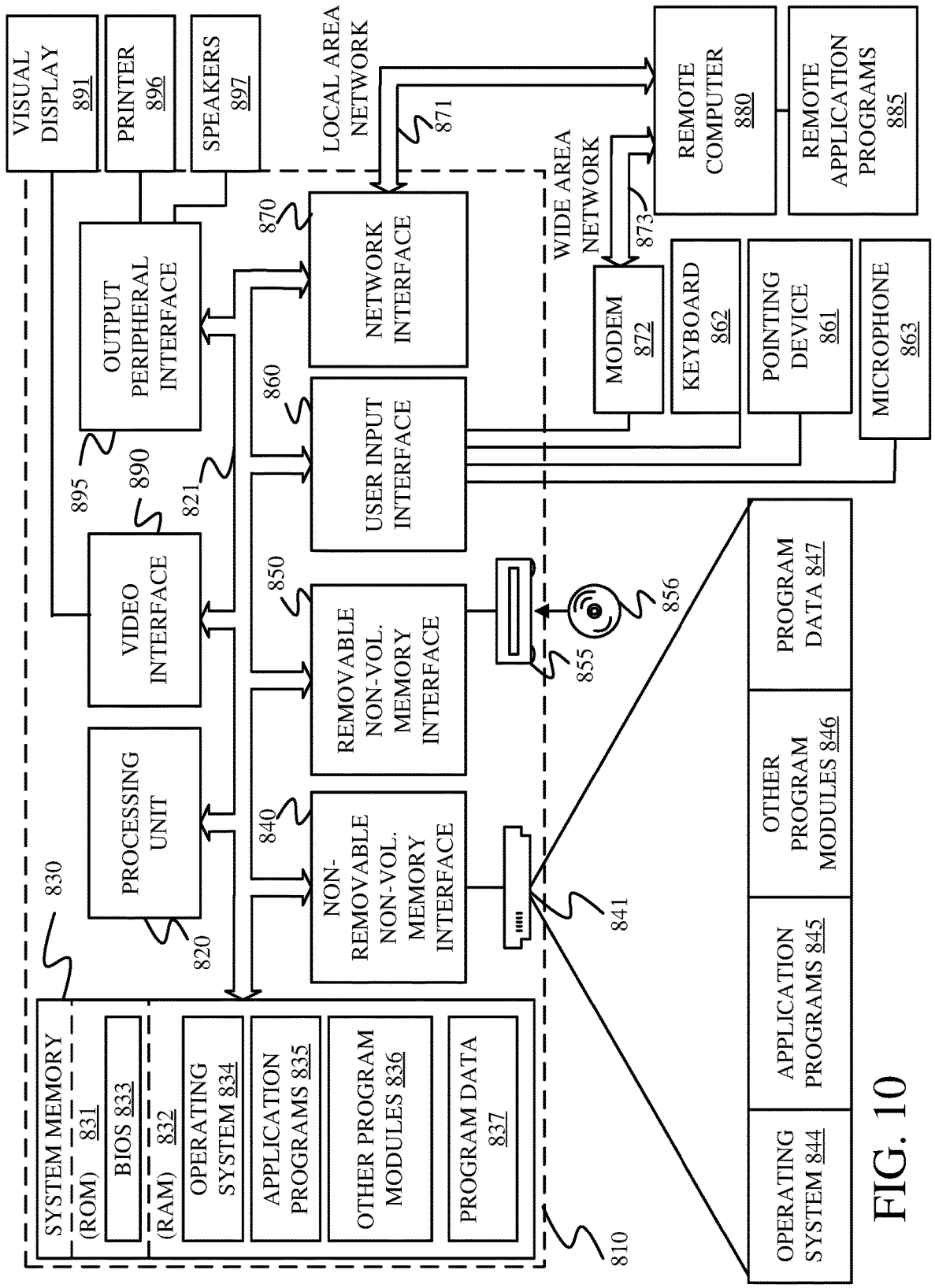
FIG. 10 is a block diagram showing one example of a computing environment that can be used in the architectures illustrated in the previous figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:
an entry selection detector that receives an undo input indicative of a selected revision to a document for which a corresponding undo operation is to be performed;
an operational transform system that accesses a revision/undo stack to identify a stack entry corresponding to the selected revision;
an operation type identifier that identifies, in the stack entry, the undo operation corresponding to the selected revision;
a subsequent operation identifier that identifies a subsequent revision made to the document subsequent to the selected revision;
a transform control system that transforms the undo operation based on the subsequent revision to obtain a transformed undo operation; and
document processing functionality that executes the transformed undo operation against the document.

Example 2 is the computer system of any or all previous examples wherein the transform control system comprises:
a transformation function identifier configured to identify a transformation function based on the subsequent revision; and
a transformation application component configured to apply the transformation function to the undo operation to obtain the transformed undo operation.

Example 3 is the computer system of any or all previous examples wherein the transform control system further comprises:
a stack traversal component configured to traverse the revision/undo stack to identify, in the revision/undo stack, a stack entry corresponding to the subsequent revision, wherein the subsequent operation identifier parses the stack entry corresponding to the subsequent revision to identify a subsequent operation used to make the subsequent revision.

Example 4 is the computer system of any or all previous examples wherein the stack traversal component identifies a plurality of stack entries each corresponding to a subsequent revision, the subsequent operation identifier being configured to identify a plurality of subsequent operations used to make the plurality of subsequent revisions to the document subsequent to the selected operation.

Example 5 is the computer system of any or all previous examples wherein the transformation function identifier is configured to identifies a plurality of transformation functions based on the plurality of subsequent operations and to determine a sequence corresponding to the plurality of transformation functions.

Example 6 is the computer system of any or all previous examples wherein the transform application component is configured to apply the plurality of transformation functions to the undo operation in the sequence to obtain the transformed undo operation.

Example 7 is the computer system of any or all previous examples and further comprising:

a stack entry generator configured to receive a revision signal indicative of a user revision to the document and generate a stack entry corresponding to the revision signal, the stack entry including an index value indicative of a position of the stack entry corresponding to the revision signal in the revision/undo stack relative to other stack entries in the revision/undo stack, a revision indicator indicative of the user revision, and an undo indicator indicative of an undo operation that reverses the user revision.

Example 8 is the computer system of any or all previous examples and further comprising:

a productivity application configured to store the stack entry corresponding to the revision signal in the revision/undo stack, close the document, and save the revision/undo stack for retrieval when the document is re-opened, reopen the document, and reload the stored revision/undo stack for access by a user.

Example 9 is the computer system of any or all previous examples and further comprising:

a stack representation generator configured to surface a representation of the revision/undo stack for user interaction prior to receiving the undo input; and an entry selection detector configured to detect, as the undo input, user selection of the stack entry corresponding to the selected revision.

Example 10 is a computer implemented method, comprising:

receiving an undo input indicative of a selected revision to a document for which a corresponding undo operation is to be performed;

accessing a revision/undo stack to identify a stack entry corresponding to the selected revision;

identifying, in the stack entry, the undo operation corresponding to the selected revision;

traversing the revision/undo stack to identify a subsequent revision made to the document subsequent to the selected revision;

transforming the undo operation based on the subsequent revision to obtain a transformed undo operation; and executing the transformed undo operation against the document.

Example 11 is the computer implemented method of any or all previous examples wherein transforming the undo operation comprises:

identifying a transformation function based on the subsequent revision; and applying the transformation function to the undo operation to obtain the transformed undo operation.

Example 12 is the computer implemented method of any or all previous examples wherein traversing the revision/undo stack to identify a subsequent revision comprises:

identifying, in the revision/undo stack, a stack entry corresponding to the subsequent revision; and parsing the stack entry corresponding to the subsequent revision to identify the subsequent revision.

Example 13 is the computer implemented method of any or all previous examples wherein traversing the revision/undo stack to identify a subsequent revision comprises:

traversing the revision/undo stack to identify a plurality of subsequent revisions made to the document subsequent to the selected operation.

Example 14 is the computer implemented method of any or all previous examples wherein identifying the transformation function comprises:

identifying a plurality of transformation functions based on the plurality of subsequent revisions; and determining a sequence corresponding to the plurality of transformation functions.

Example 15 is the computer implemented method of any or all previous examples wherein applying the transformation function comprises:

applying the plurality of transformation functions to the undo operation in the sequence to obtain the transformed undo operation.

Example 16 is the computer implemented method of any or all previous examples wherein the selected revision was made to the document by a first user and wherein receiving the undo input comprises:

receiving the undo input based on a user input from second user to undo the selected revision, the second user being different from the first user.

Example 17 is the computer implemented method of any or all previous examples and further comprising:

receiving a revision signal indicative of a user revision to the document; and generating a stack entry corresponding to the revision signal, the stack entry including an index value indicative of a position of the stack entry corresponding to the revision signal in the revision/undo stack relative to other stack entries in the revision/undo stack, a revision indicator indicative of the user revision, and an undo indicator indicative of an undo operation that reverses the user revision.

Example 18 is the computer implemented method of any or all previous examples and further comprising:

storing the stack entry corresponding to the revision signal in the revision/undo stack;

closing the document;

saving the revision/undo stack for retrieval when the document is re-opened;

reopening the document; and reloading the stored revision/undo stack for access by a user.

Example 19 is the computer implemented method of any or all previous examples and further comprising:

prior to receiving the undo input, surfacing a representation of the revision/undo stack for user interaction; and detecting, as the undo input, user selection of the stack entry corresponding to the selected revision.

Example 20 is a computer system, comprising:

one or more processors;

a data store storing instructions which, when executed by the one or more processors, cause the one or more processors to perform steps comprising:

receiving an undo input indicative of a selected revision to a document for which a corresponding undo operation is to be performed;

accessing a revision/undo stack to identify a stack entry corresponding to the selected revision;

identifying, in the stack entry, the undo operation corresponding to the selected revision;

traversing the revision/undo stack to identify a subsequent revision made to the document subsequent to the selected revision;

transforming the undo operation based on the subsequent revision to obtain a transformed undo operation; and executing the transformed undo operation against the document.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
   at least one processor; and
   memory storing instructions executable by the at least one processor, wherein the instructions, when executed, cause the computer system to:
   receive an undo input indicative of a selected revision to a document for which a corresponding undo operation is to be performed;
   access a revision/undo stack having a plurality of stack entries representing a set of revisions and defining a time order of the set of revisions, each stack entry representing a given revision in the set of revisions and comprising:
   a revision indicator that indicates the given revision, and
   an undo indicator that indicates an undo operation to undo the given revision;
   identify, in the revision/undo stack, a particular stack entry corresponding to the selected revision;
   identify, in the particular stack entry, the undo operation indicated by the undo indicator;
   traverse the revision/undo stack to identify, in the revision/undo stack, a subsequent stack entry corresponding to a subsequent revision made to the document subsequent to the selected revision;
   parse the subsequent stack entry corresponding to the subsequent revision to identify a subsequent operation used to make the subsequent revision;
   transform the undo operation based on the subsequent operation to obtain a transformed undo operation; and
   execute the transformed undo operation against the document.

2. The computer system of claim 1 wherein the instructions, when executed, cause the computer system to:
   a transformation function identifier configured to identify a transformation function based on the subsequent revision; and
   a transformation application component configured to apply the transformation function to the undo operation to obtain the transformed undo operation.

3. The computer system of claim 1 wherein the instructions, when executed, cause the computer system to identify a plurality of stack entries each corresponding to a subsequent revision, the subsequent operation identifier being configured to identify a plurality of subsequent operations used to make the plurality of subsequent revisions to the document subsequent to the selected operation.

4. The computer system of claim 3 wherein the instructions, when executed, cause the computer system to identifies a plurality of transformation functions based on the plurality of subsequent operations and to determine a sequence corresponding to the plurality of transformation functions.

5. The computer system of claim 4 wherein the instructions, when executed, cause the computer system to apply the plurality of transformation functions to the undo operation in the sequence to obtain the transformed undo operation.

6. The computer system of claim 1 wherein the instructions, when executed, cause the computer system to:
   receive a revision signal indicative of a user revision to the document and generate a stack entry corresponding to the revision signal, the stack entry including:
   an index value indicative of a position of the stack entry corresponding to the revision signal in the revision/undo stack relative to other stack entries in the revision/undo stack,
   a revision indicator indicative of the user revision, and
   an undo indicator indicative of an undo operation that reverses the user revision.

7. The computer system of claim 6 wherein the instructions, when executed, cause the computer system to:
   store the stack entry corresponding to the revision signal in the revision/undo stack, close the document, and save the revision/undo stack for retrieval when the document is re-opened; and
   reopen the document, and reload the stored revision/undo stack for access by a user.

8. The computer system of claim 1 wherein the instructions, when executed, cause the computer system to:
   surface a representation of the revision/undo stack for user interaction prior to receiving the undo input; and
   detect, as the undo input, user selection of the stack entry corresponding to the selected revision.

9. A computer implemented method, comprising:
   receiving an undo input indicative of a selected revision to a document for which a corresponding undo operation is to be performed;
   accessing a revision/undo stack having a plurality of stack entries representing a set of revisions and defining a time order of the set of revisions, each stack entry representing a given revision in the set of revisions and comprising:
   a revision indicator that indicates the given revision, and
   an undo indicator that indicates an undo operation to undo the given revision;
   identifying, in the revision/undo stack, a particular stack entry corresponding to the selected revision;
   identifying, in the particular stack entry, the undo operation indicated by the undo indicator;
   traversing the revision/undo stack to identify, in the revision/undo stack, a subsequent stack entry corresponding to a subsequent revision made to the document subsequent to the selected revision;
   parsing the subsequent stack entry corresponding to the subsequent revision to identify a subsequent operation used to make the subsequent revision;
   transforming the undo operation based on the subsequent revision operation to obtain a transformed undo operation; and
   executing the transformed undo operation against the document.

10. The computer implemented method of claim 9 wherein transforming the undo operation comprises:
    identifying a transformation function based on the subsequent revision; and applying the transformation function to the undo operation to obtain the transformed undo operation.

11. The computer implemented method of claim 10 wherein traversing the revision/undo stack to identify a subsequent revision comprises:
traversing the revision/undo stack to identify a plurality of subsequent revisions made to the document subsequent to the selected operation.

12. The computer implemented method of claim 11 wherein identifying the transformation function comprises:
identifying a plurality of transformation functions based on the plurality of subsequent revisions; and
determining a sequence corresponding to the plurality of transformation functions.

13. The computer implemented method of claim 12 wherein applying the transformation function comprises:
applying the plurality of transformation functions to the undo operation in the sequence to obtain the transformed undo operation.

14. The computer implemented method of claim 9 wherein the selected revision was made to the document by a first user and wherein receiving the undo input comprises:
receiving the undo input based on a user input from second user to undo the selected revision, the second user being different from the first user.

15. The computer implemented method of claim 9 and further comprising:
receiving a revision signal indicative of a user revision to the document; and
generating a stack entry corresponding to the revision signal, the stack entry including an index value indicative of a position of the stack entry corresponding to the revision signal in the revision/undo stack relative to other stack entries in the revision/undo stack, a revision indicator indicative of the user revision, and an undo indicator indicative of an undo operation that reverses the user revision.

16. The computer implemented method of claim 15 and further comprising:
storing the stack entry corresponding to the revision signal in the revision/undo stack;
closing the document;
saving the revision/undo stack for retrieval when the document is re-opened;
reopening the document; and
reloading the stored revision/undo stack for access by a user.

17. The computer implemented method of claim 9 and further comprising:
prior to receiving the undo input, surfacing a representation of the revision/undo stack for user interaction; and
detecting, as the undo input, user selection of the stack entry corresponding to the selected revision.

18. A computer system, comprising:
one or more processors; and
a data store storing instructions which, when executed by the one or more processors, cause the one or more processors to perform steps comprising:
receiving an undo input indicative of a selected revision to a document for which a corresponding undo operation is to be performed;
accessing a revision/undo stack having a plurality of stack entries representing a set of revisions and defining a time order of the set of revisions, each stack entry representing a given revision in the set of revisions and comprising:
a revision indicator that indicates the given revision, and
an undo indicator that indicates an undo operation to undo the given revision;
identifying, in the revision/undo stack, a particular stack entry corresponding to the selected revision;
identifying, in the particular stack entry, the undo operation indicated by the undo indicator;
traversing the revision/undo stack to identify, in the revision/undo stack, a subsequent stack entry corresponding to a subsequent revision made to the document subsequent to the selected revision;
parsing the subsequent stack entry corresponding to the subsequent revision to identify a subsequent operation used to make the subsequent revision;
transforming the undo operation based on the subsequent operation to obtain a transformed undo operation; and
executing the transformed undo operation against the document.

* * * * *